(12) United States Patent
Stajner et al.

(10) Patent No.: US 10,249,298 B2
(45) Date of Patent: Apr. 2, 2019

(54) METHOD AND APPARATUS FOR PROVIDING GLOBAL VOICE-BASED ENTRY OF GEOGRAPHIC INFORMATION IN A DEVICE

(71) Applicant: HERE Global B.V., Eindhoven (NL)

(72) Inventors: Tadej Stajner, Berlin (DE); Olivier Dousse, Berlin (DE); Eduardo Vellasques, Berlin (DE); Augusto Henrique Hentz, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 54 days.

(21) Appl. No.: 15/403,891

(22) Filed: Jan. 11, 2017

(65) Prior Publication Data

US 2018/0197537 A1      Jul. 12, 2018

(51) Int. Cl.
| | |
|---|---|
| *G10L 15/19* | (2013.01) |
| *G10L 15/30* | (2013.01) |
| *G10L 15/22* | (2006.01) |
| *G01C 21/36* | (2006.01) |

(Continued)

(52) U.S. Cl.
CPC .......... *G10L 15/19* (2013.01); *G01C 21/3608* (2013.01); *G06F 17/30958* (2013.01); *G10L 15/22* (2013.01); *G10L 15/30* (2013.01); *G10L 2015/088* (2013.01)

(58) Field of Classification Search
None
See application file for complete search history.

(56) References Cited

U.S. PATENT DOCUMENTS

| | | |
|---|---|---|
| 5,774,860 A | 6/1998 | Bayya et al. |
| 8,055,693 B2 | 11/2011 | Ezzat et al. |
| 8,271,283 B2 | 9/2012 | Jeong et al. |

(Continued)

FOREIGN PATENT DOCUMENTS

| | | |
|---|---|---|
| EP | 1975923 A1 | 10/2008 |

OTHER PUBLICATIONS

Iwami et al., "Efficient out-of-vocabulary Term Detection by N-gram Array Indices with Distance from a Syllable Lattice", International Conference on Acoustics, Speech and Signal Processing (ICASSP), May 22-27, 2011, pp. 5664-5667.

(Continued)

*Primary Examiner* — Neeraj Sharma
(74) *Attorney, Agent, or Firm* — Ditthavong & Steiner, P. C.

(57) ABSTRACT

An approach is provided for global voice-based entry of location information. The approach involves partitioning a global speech decoding graph into spatial partitions. The approach also involves determining key entities occurring in each spatial partitions to construct a combined set of key entities. The approach further involves creating a retrieval index to map the key entities in the combined set of key entities to a corresponding partition. A first partition, the combined set of key entities, and the retrieved index are stored in a memory of a device for processing a voice input signal. A second partition that is not in the memory of the device is retrieved based on the combined set of key entities and the retrieval index to automatically re-process the voice input signal when an out-of-vocabulary result is obtained from the first partition.

22 Claims, 12 Drawing Sheets

(51) Int. Cl.
*G06F 17/30* (2006.01)
*G10L 15/08* (2006.01)

(56) References Cited

U.S. PATENT DOCUMENTS

| | | | |
|---|---|---|---|
| 8,688,451 B2 | 4/2014 | Grost et al. | |
| 8,719,026 B2 | 5/2014 | Kennewick et al. | |
| 8,843,643 B2* | 9/2014 | Larson | H04L 29/12066 709/227 |
| 8,868,427 B2* | 10/2014 | Rysenga | G06Q 10/109 340/521 |
| 8,949,125 B1* | 2/2015 | Chechik | G10L 13/02 704/243 |
| 9,311,410 B2 | 4/2016 | Green et al. | |
| 9,477,753 B2* | 10/2016 | Kingsbury | G10L 15/1822 |
| 9,934,777 B1* | 4/2018 | Joseph | G10L 15/063 |
| 10,008,201 B2* | 6/2018 | Talwar | G10L 15/04 |
| 2003/0187643 A1* | 10/2003 | Van Thong | G10L 15/08 704/254 |
| 2013/0249948 A1* | 9/2013 | Reitan | G06F 3/011 345/633 |
| 2015/0067819 A1* | 3/2015 | Shribman | H04L 67/06 726/12 |
| 2016/0330180 A1* | 11/2016 | Egorov | G06F 21/6227 |
| 2017/0308583 A1* | 10/2017 | Husain | G06F 17/30528 |
| 2018/0039647 A1* | 2/2018 | Winstanley | G06F 17/30864 |
| 2018/0268015 A1* | 9/2018 | Sugaberry | G06F 17/30371 |

OTHER PUBLICATIONS

Gales et al., "The Application of Hidden Markov Models in Speech Recognition", Foundations and Trends in Signal Processing, published Feb. 21, 2008, vol. 1, No. 3, pp. 195-304.

* cited by examiner

METHOD AND APPARATUS FOR PROVIDING GLOBAL VOICE-BASED ENTRY OF GEOGRAPHIC INFORMATION IN A DEVICE

BACKGROUND

To improve user experience, many modern navigation and/or other location-based systems (e.g., embedded systems such as in-vehicle navigation systems, as well as standalone systems such as personal navigation devices and/or mobile devices running navigation applications) provide for voice-based interactions. For example, a voice destination entry (VDE) system is able to configure the destination of the navigation system via a speech interface. However, implementing automatic speech recognition (ASR) for the speech interface can be a significant technical challenge particularly in embedded and portable systems where available resources (e.g., memory, processing power, network bandwidth, etc.) can be limited. For example, having a larger number of valid utterances to provide for more natural voice interaction also means dedicating more system memory to a larger speech decoding graph (e.g., a graph for converting utterances in a voice input signal into geographic information such as a navigation destination). In the context of geographic information, the global speech decoding graph can potentially be larger in size than a device (e.g., an embedded or mobile device) can fit. Accordingly, service providers and device manufacturers face significant technical challenges to enabling more natural speech interactions possible from larger speech decoding graphs, particularly in resource-constrained devices.

SOME EXAMPLE EMBODIMENTS

Therefore, there is a need for an approach for providing global voice-based entry of geographic information in a device.

According to one embodiment, a method for automatic speech recognition in a device, comprises partitioning a global speech decoding graph into one or more spatial partitions. The method also comprises determining one or more of key entities occurring in each of the one or more spatial partitions. The method further comprises constructing a combined set of key entities comprising the one or more key entities from said each spatial partition. The method further comprises creating a retrieval index to map the one or more key entities in the combined set of key entities to a corresponding partition from among the one or more spatial partitions. A first partition from among the one or more spatial partitions, the combined set of key entities, and the retrieved index are stored in a memory of the device for processing a voice input signal. A second partition from among the one or more spatial partitions that is not in the memory of the device is retrieved based on the combined set of key entities and the retrieval index to automatically re-process the voice input signal when an out-of-vocabulary result is obtained with respect to the first partition.

According to another embodiment, an apparatus for automatic speech recognition in a device, comprises at least one processor, and at least one memory including computer program code for one or more computer programs, the at least one memory and the computer program code configured to, with the at least one processor, cause, at least in part, the apparatus to partition a global speech decoding graph into one or more spatial partitions. The apparatus is also caused to determine one or more of key entities occurring in each of the one or more spatial partitions. The apparatus is further caused to construct a combined set of key entities comprising the one or more key entities from said each spatial partition. The apparatus is further caused to create a retrieval index to map the one or more key entities in the combined set of key entities to a corresponding partition from among the one or more spatial partitions. A first partition from among the one or more spatial partitions, the combined set of key entities, and the retrieved index are stored in a memory of the device for processing a voice input signal. A second partition from among the one or more spatial partitions that is not in the memory of the device is retrieved based on the combined set of key entities and the retrieval index to automatically re-process the voice input signal when an out-of-vocabulary result is obtained with respect to the first partition.

According to another embodiment, a non-transitory computer-readable storage medium for automatic speech recognition in a device, carries one or more sequences of one or more instructions which, when executed by one or more processors, cause, at least in part, an apparatus to partition a global speech decoding graph into one or more spatial partitions. The apparatus is also caused to determine one or more of key entities occurring in each of the one or more spatial partitions. The apparatus is further caused to construct a combined set of key entities comprising the one or more key entities from said each spatial partition. The apparatus is further caused to create a retrieval index to map the one or more key entities in the combined set of key entities to a corresponding partition from among the one or more spatial partitions. A first partition from among the one or more spatial partitions, the combined set of key entities, and the retrieved index are stored in a memory of the device for processing a voice input signal. A second partition from among the one or more spatial partitions that is not in the memory of the device is retrieved based on the combined set of key entities and the retrieval index to automatically re-process the voice input signal when an out-of-vocabulary result is obtained with respect to the first partition.

According to another embodiment, an apparatus for automatic speech recognition in a device, comprises means for partitioning a global speech decoding graph into one or more spatial partitions. The apparatus also comprises means for determining one or more of key entities occurring in each of the one or more spatial partitions. The apparatus also comprise means for constructing a combined set of key entities comprising the one or more key entities from said each spatial partition. The apparatus further comprises means for creating a retrieval index to map the one or more key entities in the combined set of key entities to a corresponding partition from among the one or more spatial partitions. A first partition from among the one or more spatial partitions, the combined set of key entities, and the retrieved index are stored in a memory of the device for processing a voice input signal. A second partition from among the one or more spatial partitions that is not in the memory of the device is retrieved based on the combined set of key entities and the retrieval index to automatically re-process the voice input signal when an out-of-vocabulary result is obtained with respect to the first partition.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing global voice-based entry of geographic information in a device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
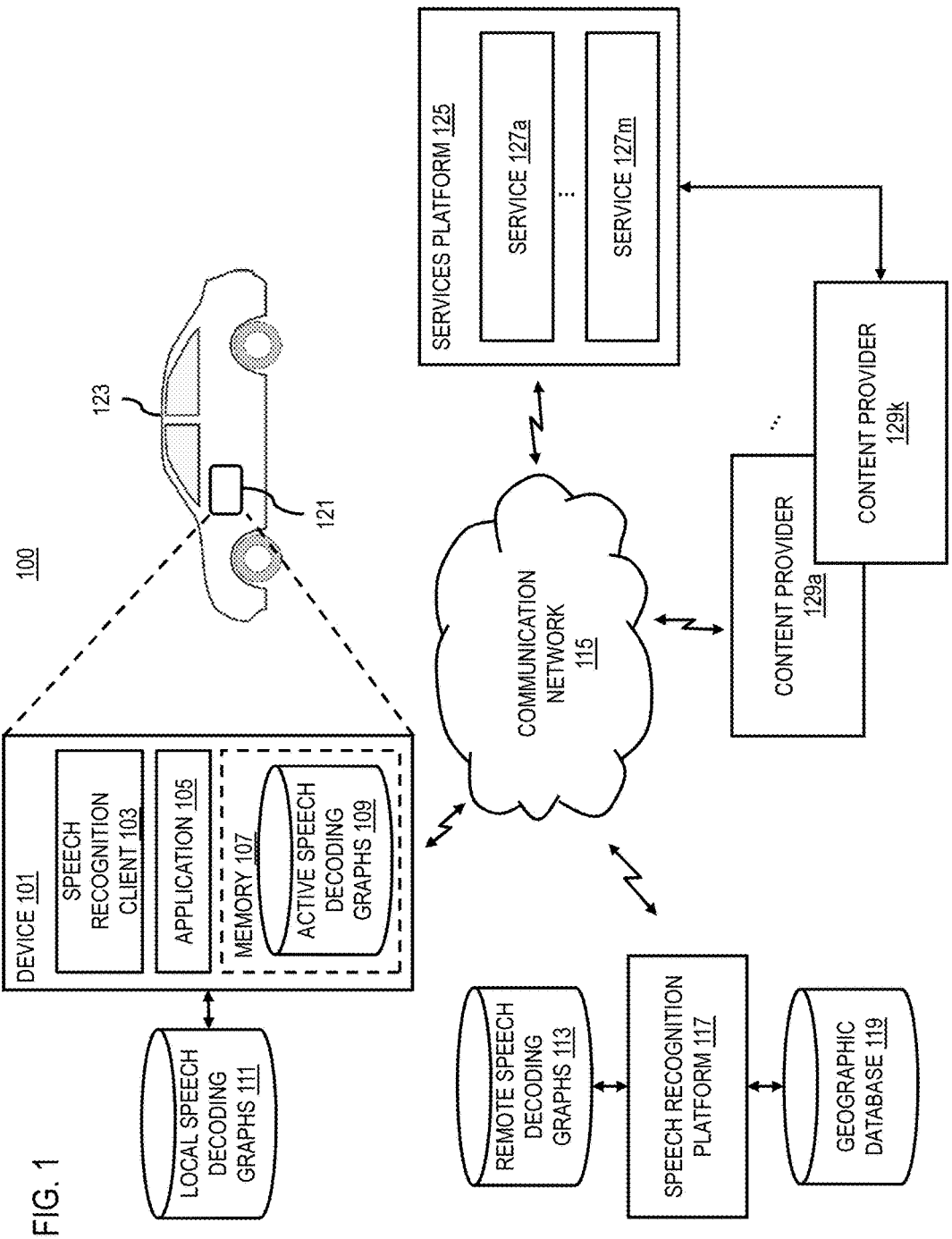
FIG. 1 is a diagram of a system for providing global voice-based entry of geographic information in a device, according to one embodiment.

FIG. 1 is a diagram of a system for providing global voice-based entry of geographic information in a device, according to one embodiment. As previously discussed, voice-based interaction with navigation and other location-based systems is becoming increasingly popular. For example, as navigation systems become more complex, voice-based interactions or control can make driving safer by reducing the cognitive load and/or distractions by making system control more familiar. Depending on system constraints and interface design, voice-based interactions can be: (1) structured (e.g., driver speaks in multiple turns with a pre-defined field order: country, region, city, street, etc.); (2) one-shot (e.g., driver states the entire destination in a single utterance); or (3) any-shot (e.g., driver states the destination in a conversation manner using an arbitrary number of turns).

The type of interaction is chiefly determined by the system's hardware constraints. The more structured the search or interaction is, the easier each individual utterance is to interpret, since the structure limits the number of options. This, in turn, limits the size of the speech decoding graph that is needed because graph need only include the limited number of options (e.g., terms or geographic entities) that is appropriate for a given structure. For example, stating the city beforehand already limits the possible values in the subsequent street entry turn. Therefore, the system need only use a speech decoding graph that include entities that correspond to the possible values in the subsequent street entry turn. In other words, having a larger number of valid utterances at a given turn means that dedicating more system memory to the decoding graph.

However, if the speech interface is less constrained, more possible destination entry patterns can be successfully interpreted, providing a more natural user experience instead of failing to recognize an out-of-vocabulary (OOV) utterance. An OOV utterance, for instance, is an utterance detected in voice input signal that does not match an entity in the applied speech decoding graph or cannot otherwise be interpreted to generate a recognition result using the applied speech decoding graph.

In some cases, especially when a system is not using a structured approach to voice-based entry of geographic information, the size of a complete or global speech decoding graph needed to support a more natural user experience often means that global speech decoding graph has to be partitioned into smaller portions to fit into memory constraints. However, partitioning can lead to an OOV situation when a user's geographic input (e.g., a destination) specified in a voice input signal is not contained in the active partition of the decoding graph. This OOV situation typically results in a misrecognized utterance and a wrong but similarly sounding result. From a user's perspective, the wrong result provides a poor user experience in which a user has to rephrase the voice input, or default to a non-voice mode of entry of the geographic information.

To address this problem, a system 100 of FIG. 1 introduces a capability to provide a seamless and natural experience for global voice-based entry of geographic information (e.g., navigation destination entry) by considering OOV phrases or keywords in a voice signal input when working with spatially partitioned speech decoding graphs (e.g., speech decoding graphs that are partitioned according to a geographic topology of the geographic terms or entities contained in the graphs, so that a spatial partition would contain a decoding graph comprising entities, locations, terms, etc. associated with a geographic area covered by the spatial partition). In one embodiment, the system 100 enables an automatic re-interpretation of a user's voice signal input (e.g., audio query) with another decoding graph when the system 100 detects an OOV result with the active decoding graph. For example, using the recognition result from the active decoding graph, the system 100 identifies keywords that would suggest which other partition would have a higher likelihood of containing the desired phrase. The other partition is retrieved and made active to automatically re-interpret or process the original voice signal input without having the user rephrase or restate the input.

In one embodiment, the system 100 identifies a limited a set of key entities (e.g., locations, terms, control words, etc.) from each partition comprising a complete or global speech decoding graph (e.g., those entities most searched for in each partition, most popular entities, etc.). For example, a key entity may be a place (of any type) that passes an importance threshold based on a combination criteria (e.g., geographic scope, administrative scope, mention frequency, etc.). The system 100 constructs a decoding graph of this limited set of key entities and an index that maps the key entities to one or more corresponding spatial partitions. In one embodiment, this decoding graph can include a key lexicon containing valid phonetic representations of the key entities. This decoding graph of key entities can be added to each decoding graph in each of the spatial partitions, so that the key entities are always in an active partition and available to interpret voice signal inputs when an OOV situation occurs.

For instance, a voice-based search for "Eiffel Tower, Paris" while starting with the decoding graph partition for Germany would result in a misrecognized OOV query. However, since every decoding graph partition is designed to recognize keywords that can signal the use of other partitions (e.g., because they contain the decoding graph for the limited set of key entities that is combined into all spatial partitions), it would be able to recognize the presence of the keyword "Paris." In this example, it is noted that the complete phrase "Eiffel Tower, Paris" is OOV with respect to the partition for Germany because the "Eiffel Tower" entity is not located in Germany. However, during the process of preparing each partition, the system 100 identified "Paris" as a key entity for the partition for France because Paris is one of the most searched for terms in the partition. Accordingly, an utterance in the voice signal input that corresponds "Paris" can be recognized using the German partition because the partition includes the decoding graph for the limited set of key entities when the partition is active on a device. Because the entity "Paris" is indexed to the spatial partition for France (e.g., based on the retrieval index mentioned above), the system 100 can retrieve and activate the decoding graph partition for France. Accordingly, the system 100 can automatically trigger reinterpretation of the original voice signal input (e.g., "Eiffel Tower, Paris") with the decoding graph partition corresponding to France, resulting in a successful recognition. This process takes places seamlessly, without interaction from the user, except for a slightly longer recognition delay incurred by re-interpreting the query with another decoding graph.

More specifically, in one embodiment, global voice-based entry of geographic information includes voice destination entry (VDE). It is noted that VDE is provided by way of illustration and not limitation, and that the various embodiments described herein is applicable to voice-based entry of any geographic information for any location-based service such as navigation, mapping, recommendations, general queries, etc. In this example, VDE is the act of recognizing an utterance representing a natural language spoken query to navigate to a specific location. Typically, locations are organized hierarchically, often with several distinct hierarchies (administrative units, postal codes, informal neighborhoods, and others). The simplest VDE systems expect the user to state their destination in decreasing hierarchy level: for instance, "city, street, house number." However, as noted above, imposing such a structured method of input can provide a poor user experience because typical human behavior does not always follow that order. For example, in many western cultures, the reverse order is much more frequent. This suggests that an automatic speech recognizer (e.g., a speech recognition platform 117 and/or speech recognition client 103 as shown in FIG. 1) should be indifferent to token order, but it is still desirable from a performance standpoint to take advantage of conditional dependencies between such location tokens.

Furthermore, in various embodiments, these dependencies are central to the approaches presented herein. For example, in one embodiment, the system 100 performs at least the following functions: (1) spatial partitioning of a global decoding graph to construct individual partitions (e.g., spatial partitions) containing the portion of the global decoding graph corresponding the geographic area covered by the individual partitions; (2) indexing the partitions according to key entities contained therein so that they can be retrieved for re-interpretation of voice signal inputs; (3)

detection of OOV situations for voice signal inputs with respect initial partitions; and (4) obtaining other potential partitions from a recognition result of an OOV situation to re-interpret OOV voice signal inputs.

The processes described above be symbolically represented according to the following description. In one embodiment, $a_i \in A$ symbolically represents a distinct location entity in a graph A. Location entities (also referred to as entities) are ordered in the acyclic graph A, defining an "is contained in" relation $C \subset \{c=(a_i, a_j) \in A \times A\}$. Using this terminology, $A_p \subset A$ represents a spatial partition of A. Every partition is also accompanied by a set of key entities $K_p \subset A_p$ that is used for the indexing process discussed with respect to the various embodiments described herein.

In one embodiment, to prepare the data structures (e.g., the decoding graph partitions), the system 100 performs the following steps. First, the system 100 determines the spatial partitioning of the data (e.g., the global speech decoding graph). By way of example, this can be done according to any of several different criteria: administrative units, number of location entities, and/or others.

Then, the system 100 determines key entities $K_p$ for every partition. In one embodiment, the key entities are selected based criteria including, but not limited to: (1) the key entities should cumulatively appear frequently in location queries for that partition, and/or (2) there are as few of the key entities as possible or as configured by the system 100 (e.g., by setting a maximum number for each partition). In one embodiment, a minimal example would be picking all entities that contain at least some other entities:

$$K_p = \{a_i; \exists a_j: (a_i, a_j) \in C\}$$

This criterion would include cities, postal codes, neighborhoods, regions, but not streets or POIs, since they do not subdivide further in one embodiment of the data model. Alternatively, other criteria may be used, such as number of contained entities, destination popularity, the user's mobility habits, etc.

After determining the key entities, the system 100 constructs a decoding graph containing the key entities. In a typical voice recognition system generally known in the art, the decoding graph can be composed of four functions, $D = H \circ C \circ L \circ G$, where $H \circ C$ is the transition model that transforms the acoustic model signal to phonemes, L is the inverted pronunciation lexicon, transforming phoneme sequences to word tokens, and G constrains the sequences of word tokens into a valid grammar. While HC is generally fixed for a given language, the size of D typically increases with the size of the lexicon L and the grammar G.

In one embodiment, the system 100 defines $K = \cup K_p$, the union of all key entities. Accordingly, $L_K$ represents the pronunciation lexicon of all the key entities, and $G_K$ a grammar that accepts them. With partitions and indexing in mind, the system 100 defines each partition's decoding graph as follows:

$$D_p = H \circ C \circ (L_p \cup L_K) \circ (G_p \cup G_K)$$

where $L_p$ is the partition lexicon and $G_p$ is the partition grammar. This definition ensures that every decoding graph is capable of recognizing all key entities at a small cost of increasing the decoding graph size.

In one embodiment, the unions $L_p \cup L_K$ and $G_p \cup G_K$ and their composition can be performed during the decoding graph construction. In yet another embodiment, the unions $L_p \cup L_K$ and $G_p \cup G_K$ and their composition can be performed later with on-line composition and union operations, when loading a given partition. This allows for a tradeoff of lower disk consumption, but higher CPU consumption when using on-line composition. If $(L_p \cup L_K) \circ (G_p \cup G_K)$ is performed during the decoding graph construction, the size of every partition is increased by at most $|L_K| + |G_K|$, with no additional CPU cost for partition loading. However, if this operation is delayed to the partition loading time, it is only necessary to store $L_K$ and $G_K$ once, possibly allowing the storage of additional partitions in a given disk space budget, with the tradeoff of increased CPU cost when loading a given partition.

As shown in FIG. 1, the system 100 comprises a device 101 (e.g., an embedded or standalone mobile device) including a speech recognition client or module 103 for providing a speech interface for global voice-based entry of geographic information as discussed with respect to the various embodiments described herein. In one embodiment, the speech interface supports voice-based user interactions for an application 105 (e.g., a navigation application and/or any other application in which entry of geographic information is supported) executing on the device 101. The device 101 also includes a memory 107 (e.g., RAM memory, equivalent runtime memory, and/or other volatile memory) for storing active speech decoding graphs or partitions 109 currently in use by the speech recognition client 103. In addition, the device 101 includes or otherwise has access to other local speech decoding graphs or partitions 111 stored in a local storage unit of the device 101 (e.g., a disk storage unit, flash memory storage unit, and/or other non-volatile memory storage unit).

In one embodiment, the device 101 has access to remote speech decoding graphs or partitions 113 over a communication network 115 via a speech recognition platform 117. In one embodiment, the speech recognition platform 117 is a corresponding network component to the speech recognition client 103. Accordingly, the speech recognition platform 117, alone or in combination with the speech recognition client 103, can perform all or a portion of the functions described with respect to embodiments of the system 100 and/or the speech recognition client 103.

In one embodiment, the remote speech decoding graphs 113 include all of the spatial partitions of a global speech decoding for location entities associated with or stored in a geographic database 119. In one embodiment, the remote speech decoding graphs 113 serve as the master set of graphs from which the local speech decoding graphs 111 and the active speech decoding graphs are obtained. In a typical architecture of the system 100, the remote speech decoding graphs 113 are stored in remote data servers that have large storage capacities. The local speech decoding graphs 111 are stored in local storage units of the device 101 which are typically more limited in capacity. Finally, the active speech decoding graphs 109 are stored in active or runtime memory of the device 101 which typically have even more limited capacity. Accordingly, in one embodiment, the system 100 can control the flow or management of allocations decoding graph partitions among the active speech decoding graphs 109, the local speech decoding graphs 111, and the remote speech decoding graphs 113 to ensure or prioritize the most efficient availability of the decoding graphs that are most likely to be needed to interpret user voice input signals for a given context or application. Additional discussion of the partition management functions of the system 100 is provided below with respect to FIGS. 6 and 7.

As previously discussed, the device 101 can be an embedded device or a standalone device. When implemented as an embedded device, the device 101 can be an embedded navigation system 121 of the vehicle 123 or a component of the navigation system 121. Accordingly, the speech interface for global voice-based entry of geographic information described with respect to embodiments of the device 101 can be used to provide VDE functions for the navigation system 121. Although the vehicle 123 is depicted as an automobile, it is contemplated that the vehicle 123 can be any type of transportation vehicle manned or unmanned (e.g., planes, aerial drone vehicles, motor cycles, boats, bicycles, etc.). In one embodiment, when implemented as a standalone device, the device 101 can be a mobile device (e.g., a personal navigation system, smartphone, mobile computer, etc.) associated with any vehicle, person, or thing. In other words, the device 101, navigation system 121, and/or vehicle 123 are end user devices that are clients or consumers of navigation and/or mapping related services.

In one embodiment, the device 101, navigation system 121, and/or vehicle 123 may include sensors for reporting location-related measurements and/or other contextual attributes (e.g., weather, lighting condition, etc.). The attributes can also be any attribute normally collected by an on-board diagnostic (OBD) system of the vehicle, and available through an interface to the OBD system (e.g., OBD II interface or other similar interface). These attributes can be activation of backup sensors, steering angle, activation of brakes, etc. that can potentially be indicative of parking-related behavior. In one embodiment, the device 101, navigation system 121, and/or vehicle 123 may be configured with one or more sensors for collecting the location data using sensors such as satellite-based location receivers (e.g., GPS), accelerometers, compass sensors, gyroscopes, altimeters, etc.

In one embodiment, the device 101, navigation system 121, and/or vehicle 123 may provide a speech interface for global voice-based entry of geographic information to request navigation or mapping related services (e.g., VDE). By way of example, these services can be provided by a service platform 125, one or more services 127-127m (also collectively referred to as services 127), one or more content providers 129-129k (also collectively referred to as content providers 129), or a combination thereof. In one embodiment, the device 101, navigation system 121, and/or vehicle 123 may execute a client application (e.g., application 105) to access the services or functions of the service platform 125, the services 127, and/or the content providers 129. Through these services, the application 105 may acquire navigation information, location information, mapping information, other data associated with the current location, direction of movement along a roadway, etc. of the device 101, navigation system 121, and/or vehicle 123.

By way of example, the device 101 may be any mobile computing device including, but not limited to, an in-vehicle navigation system 121, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system.

As discussed above, the device 101, navigation system 121, and/or vehicle 123 may be configured with various sensors for acquiring and/or generating location data. For example, the sensors may be used as GPS receivers for interacting with one or more satellites to determine and track the current speed, position and location of a vehicle travelling along a roadway. In addition, the sensors may gather tilt data (e.g., a degree of incline or decline of the vehicle during travel), motion data, light data, sound data, image data, weather data, temporal data and other data associated with the device 101, navigation system 121, and/or vehicle 123. Still further, the sensors may detect local or transient network and/or wireless signals, such as those transmitted by nearby devices during navigation along a roadway. This may include, for example, network routers configured within a premise (e.g., home or business), other devices or vehicles, or a communicable traffic system (e.g., traffic lights, traffic cameras, traffic signals, digital signage).

By way of example, the speech recognition client 103 and/or the speech recognition platform 117 may be implemented as a cloud based service, hosted solution or the like for performing the above described functions. Alternatively, the speech recognition client 103 and/or the speech recognition platform 117 may be directly integrated for processing data generated and/or provided by the service platform 125, services 127, content providers 129, and/or applications 105. Per this integration, the speech recognition client 103 and/or the speech recognition platform 117 may perform client-side global voice-based entry of geographic information as described with respect to the various embodiments described herein.

By way of example, the communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, speech recognition client 103 and/or the speech recognition platform 117 communicate with other components of the system 100 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
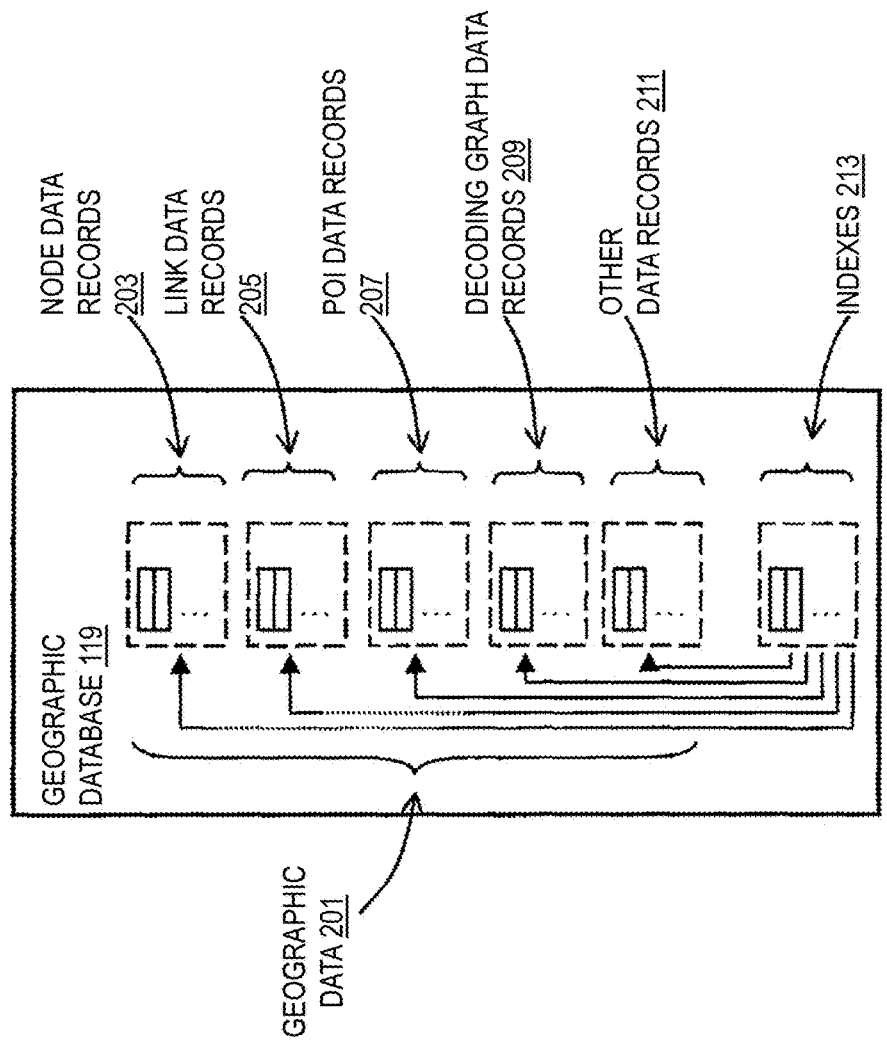
FIG. 2 is a diagram of a geographic database, according to one embodiment.

FIG. 2 is a diagram of the geographic database 119, according to one embodiment. In one embodiment, the global speech decoding graph includes the location entities stored within the geographic database. Accordingly, the global decoding graph can be partitioned according to be associated with any geographic area or location of the geographic database 119. The extent of the geographic area for each spatial partition of the decoding can be dependent on the criteria used to construct the partitions. In one embodiment, the spatial partitions can be stored, associated with, and/or linked to the geographic database 119 or data thereof.

In one embodiment, the geographic or map database 119 includes geographic data 201 used for (or configured to be compiled to be used for) spatial partitioning of a global speech decoding graph. The geographic data 201 can also be used for mapping and/or navigation-related services, such as for route information, service information, estimated time of arrival information, location sharing information, speed sharing information, and/or geospatial information sharing, according to exemplary embodiments. For example, the geographic database 201 includes node data records 203, road segment or link data records 205, POI data records 207, decoding graph data records 209, other data records 211, and/or indexes 213 for example. More, fewer or different data records can be provided.

In one embodiment, the indexes 213 may improve the speed of data retrieval operations in the geographic database 119. In one embodiment, the indexes 213 may be used to quickly locate data (e.g., decoding graph data records 203) without having to search every row in the geographic database 119 every time it is accessed. In one embodiment, the other data records 211 include cartographic ("carto") data records, routing data, and maneuver data. As noted above, the maneuver data identify potential maneuvers within a network comprised of two or more adjacent road links. In other words, a maneuver indicates possible turns or other actions a device traveling a transportation network can take. In one embodiment, maneuvers are defined at intersections nodes where different turns or actions can be taken. Each maneuver would then comprise the links making up each possibility (e.g., links indicating a left turn at the intersection node, a right turn at an intersection node, continuing straight at an intersection node, etc.).

In one embodiment, one or more portions, components, areas, layers, features, text, and/or symbols of the POI or event data can be stored in, linked to, and/or associated with the geographic data 201 using the POI data records 207. For example, one or more portions of a POI and/or characteristics of the POI (e.g., descriptive metadata, related event data, etc.) can be matched with respective map or geographic records via position or GPS data associations (such as using known or future map matching or geo-coding techniques), for example. In one embodiment, the POI data records 207 may also include information on locations of traffic controls (e.g., stoplights, stop signs, crossings, etc.).

In exemplary embodiments, the road segment or link data records 205 are links or segments representing roads, streets, or paths, as can be used in the calculated route or recorded route information. The link data records 205 can include road density information that represent at least a physical length of a link. In some embodiments, the length or road density of link can be measured directly from the road way or may be calculated as the distance between the starting and ending nodes of the link. In one embodiment, the one or more adjacent links can be combined into a super link as discussed in the various embodiments described herein. In this case, the link data records 205 can also store information on super links that have been created, and information on the regular links included the corresponding supper link. The link data records can also indicate a direction of travel along the link to facilitate determining available paths through a road network. In one embodiment, the node data records 203 are end points corresponding to the respective links or segments of the road segment data records 205.

The road link data records 205 and the node data records 203 represent a road network, such as used by vehicles, cars, and/or other entities. In other words, the nodes and links of the data records 203 and 205 comprise a system for representing the geospatial characteristics of a transportation the nodes represent various location points (e.g., latitude and longitude) of the network and the links represent an extent of a road or path between the nodes. Generally, the nodes are located at intersections points of the road network to minimize the number of nodes needed to represent a transportation network. However, in some embodiments, a node can also fall at a non-intersection point. In which case, the node at the non-intersection can be a shape node which can be used to indicate or more closely follow a road or path with a more complex shape. Alternatively, the geographic database 119 can contain path segment and node data records or other data that represent pedestrian paths or areas in addition to or instead of the vehicle road record data, for example.

The road link and nodes can be associated with attributes, such as a functional class, a road density or link length, a speed attribute (e.g., speed limit along a link, a free-flow speed of traffic along a link, and/or any other indication of an expected speed of travel along the link), parking availability information, geographic coordinates, street names, address ranges, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. As indicated above, the geographic database 201 can include data about the POIs and their respective locations in the POI data records 207. The geographic database 201 can also include data about places or administrative units, such as cities, towns, or other communities, and other geographic features, such as bodies of water, mountain ranges, etc. Such place or feature data can be part of the POI data or can be associated with POIs or POI data records 207 (such as a data point used for displaying or representing a position of a city). In one embodiment, POI data records 207 specify POI names, locations, etc. that can be at least a portion of the location entities included the decoding graphs. Other examples of location entities include, but are not limited to, the labels or names associated with the places, administrative units, features, etc. of the geographic database 119.

In one embodiment, the geographic data 201 also includes decoding graph data records 209 that can store either the spatial partitions of decoding graph or pointers to the spatial partitions. The decoding graph data records can also store information to map the spatial partitions to corresponding areas of the map that the partitions cover. For example, the location entities in each partition (except for the combined key entities that span partitions) are typically associated with a respective location or area of the geographic map. The association can be stored in the decoding graph data records 209. In one embodiment, the decoding graph data records 209 can also store information on where each spatial is allocated with respect to remote storage on a network server, and local storage in a storage unit and/or active memory of a device 101.

In one embodiment, the geographic database 201 and/or the speech decoding graphs 109-113 can be maintained by the content provider 129 in association with the service platform 125 (e.g., a map developer). The map developer can collect geographic data to generate spatial partitions of speech decoding graphs for geographic information and enhance the geographic database 119. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 201 and/or the decoding graphs 109-113 can be a master database stored in a format that facilitates updating, maintenance, and development. For example, the master geographic database 201 or data in the master geographic database 201 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data, geospatial information, and/or related spatial speech decoding graphs/partitions are compiled (such as into a platform specification format (PSF) format) to organize and/or configure the data for voice-based interactions to perform map or navigation-related functions and/or services, such as VDE, map annotation, route calculation, route guidance, map display, speed calculation, distance and travel time functions, and other functions, by a navigation device, such as by the device 101, navigation system 121, and/or vehicle 123, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 201 can be a master geographic database, but in alternate embodiments, the geographic database 201 can represent a compiled navigation database that can be used in or with end user devices to provide navigation- or mapping-related functions. For example, the geographic database 201 can be used with the end user device 101 to configure the device 101 for global voice-based entry of geographic information. In such a case, the geographic database 201 (e.g., including decoding graph data records 209) can be downloaded or stored on the end user device (e.g., device 101, navigation system 121, vehicle 123, etc.), such as in application 105 or memory 107, or the end user devices 101, 121, and/or 123 can access the geographic database 201 through a wireless or wired connection (such as via a server, e.g., the speech recognition platform 117, and/or the communication network 115), for example.

Figure 3:
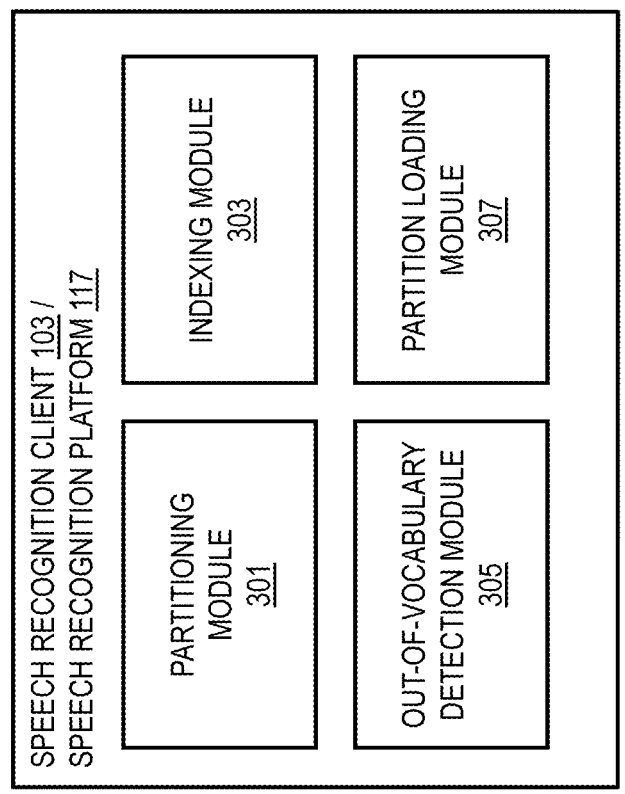
FIG. 3 is a diagram of the components of a speech recognition platform used for global voice-based entry of geographic information, according to one embodiment.

FIG. 3 is a diagram of the components of a speech recognition client 103 and/or a speech recognition platform 117, according to one embodiment. In one embodiment, the functions discussed with respect the various embodiments described herein for providing a global voice-based entry of geographic information can be performed locally at a device 101 by the speech recognition client 103 and/or remotely by speech recognition platform 117. Either the speech recognition client 103 and/or the speech recognition platform 117 can operate alone or in combination to perform these functions. Accordingly, the speech recognition client 103 and the speech recognition platform 117 can include the same or similar components. It is noted that when the descriptions contained herein refer to either the speech recognition client 103 or the speech recognition platform 117 alone, it is contemplated that the description applies equally to both the client 103 and the platform 117.

By way of example, the speech recognition client 103 and/or the speech recognition platform 117 include one or more components for a global voice-based entry of geographic information. It is contemplated that the functions of these components may be combined or performed by other components of equivalent functionality. In this embodiment, the components of the client 103 and/or platform 117 include a partitioning module 301 to spatially partition a global decoding graph and construct individual partitions, an indexing module 303 to index the spatial partitions so that they can be retrieved for re-interpretation, and out-of-vocabulary (OOV) detection module 305, and a partition loading module 307 to obtain potential partitions from a recognition result of an OOV situation. The above presented modules and components of the client 103 and/or platform 117 can be implemented in hardware, firmware, software, or a combination thereof. Though depicted as a separate entities in FIG. 1, it is contemplated that the speech recognition client 103 and the speech recognition platform 117 may be implemented as a module of any of the components of the system 100. In another embodiment, one or more of the modules 301-307 may be implemented as a cloud based service, local service, native application, or combination thereof. The functions of these modules 301-307 are discussed with respect to FIGS. 4-8 below.

Figure 4:
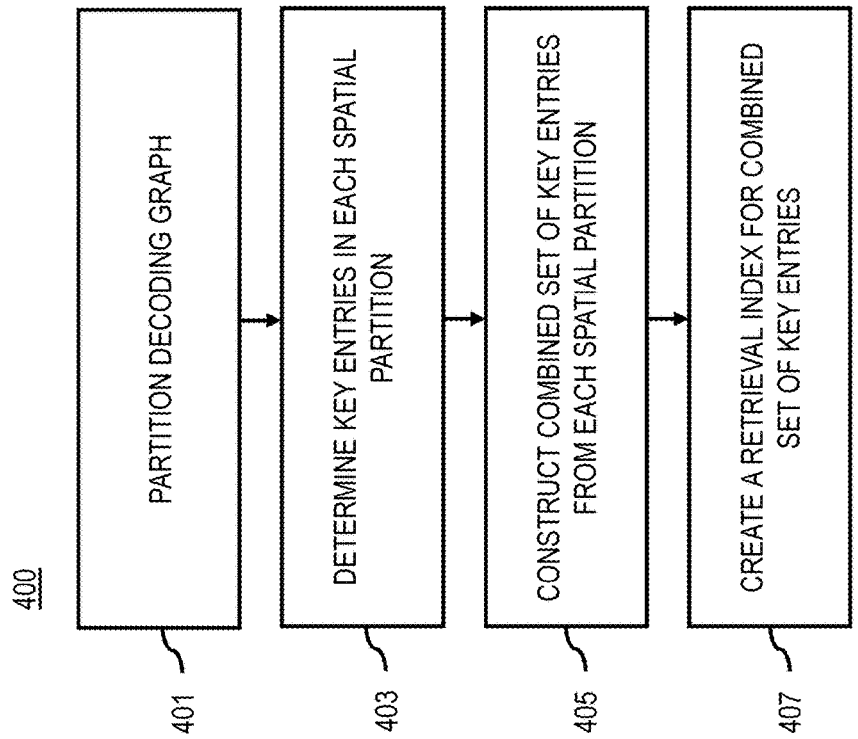
FIG. 4 is a flowchart of a process for partitioning a decoding graph for global voice-based entry using spatial partitions, according to one embodiment.
Figure 11:
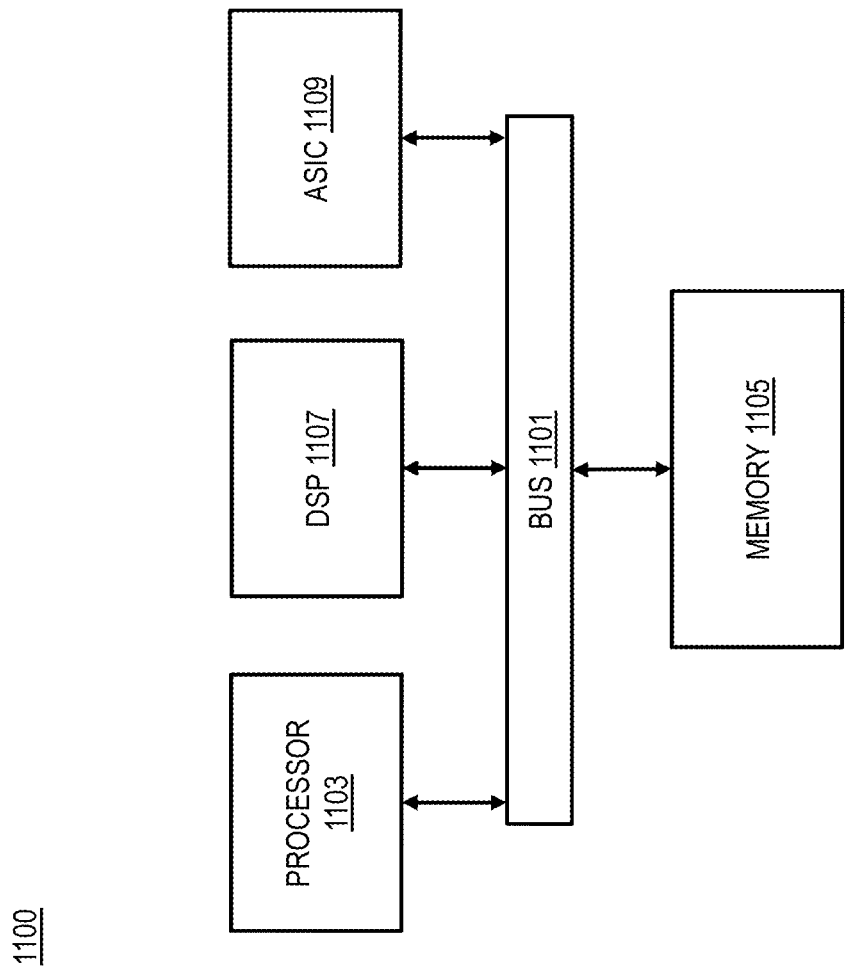
FIG. 11 is a diagram of a chip set that can be used to implement an embodiment of the invention.

FIG. 4 is a flowchart of a process for partitioning a decoding graph for global voice-based entry using spatial partitions, according to one embodiment. In various embodiments, the client 103, platform 117, and/or the modules 301-307 as shown in FIG. 3 may perform one or more portions of the process 400 and may be implemented in, for instance, a chip set including a processor and a memory as shown in FIG. 11. As such, the client 103, platform 117, and/or the modules 301-307 can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

At process 401, the partitioning module 301 partitions a global speech decoding graph into one or more spatial partitions. In one embodiment, the partitioning module 301 can use any criteria or process for creating the spatial partitions including, but not limited to: a geographic topology of geographic entities in the global speech decoding graph, geographic criteria, administrative criteria, behavioral criteria such as mobility patterns, and/or the like. For example, the geographic or location entities in each spatial partition would be associated with locations falling within the geographic area associated with the corresponding partition. As previously discussed, the partitioning can be based on administrative units, number of location entries, and the like. With respect to administrative units, the units can be defined with respect to geographic boundaries including artificial boundaries (e.g., tile boundaries for a Mercator projection of mapping data), natural boundaries (e.g., political boundaries corresponding to neighborhoods, postal codes, towns, cities, states, countries, etc.), and/or any other boundary defined for the system 100 and/or geographic database 119. With respect to number of location entries, the extent geographic areas covered by each spatial partition can be dependent on the number of entities in each partition. In one embodiment, each partition can be approximately of equal size because each would contain approximately the same number of entities regardless of geographic area. For example, partitions within dense city centers (e.g., with more streets, POIs, etc.) would be smaller in geographic coverage area than partitions for more rural areas where the density of entities is lower. However, in other embodiments, it is contemplated that partitions need not be of equal size, and that the system 100 can determine the appropriate sizes of each partition based on any other criteria such as device memory requirements, popularity of a partition or the geographic area it covers, etc.

At process 403, the partitioning module 301 determines one or more of key entities occurring in each of the one or more spatial partitions. By way of example, the key entities represent locations and/or other geographic information whose names are most closely associated with a partition and therefore likely to be identified in queries for geographic information in the area. For example, the partitioning module 301 determines the one or more key entities based on an occurrence frequency in location queries for said each spatial partition, and/or based on whether the one or more key entities can be further sub-divided.

In one embodiment, to determine the occurrence frequency of key entities, the system 100 can process historical location queries for location entity names and then rank them according to how many times they occur in those historical queries. The partitioning module 301 can then specify the top X number of more frequently occurring entities as the key entities. In one embodiment, the exact number X can be set or minimized to keep the size of the portion of the decoding graph comprising the lexicon and grammars for the key entities to a minimum size or a size below a threshold value.

In one embodiment, whether a location entity can be further subdivided can be a basis for designating the entity as a key entity. For example, location entities that typically correspond to larger geographic areas such as countries, cities, neighborhoods, etc. are more likely to be subdivided than location entities such as streets, or individual POIs. Accordingly, in one embodiment, the partitioning module 301 can determine what level in this subdivision hierarchy to designate as key entities based the total number of desired key entities.

It is noted that these two example criteria are provided for illustration and not limitation. Accordingly, the system 100 can use any criteria to designate key entities from among location entities occurring in spatial partitions. For example, in yet another embodiment, the partitioning module 301 determines the one or more key entities based on a number of contained entities, a popularity of a destination indicated in the one or more key entities, a user mobility history, or a combination thereof.

At process 405, the partitioning module 301 constructs a combined set of key entities comprising the one or more key entities from said each spatial partition. In one embodiment, the combined set of key entities includes a lexicon and a grammar associated with the one or more key entities. In other words, the partitioning module 301 creates speech decoding graph for this set of combined key entities.

The combined key entities and its corresponding decoding graph are then associated or combined with each spatial partition. In this way, each active partition would have the decoding graph that is able to interpret at least the key entities occurring in other spatial partitions. The incorporation of the combined entities into each spatial partition can occur as follows: (1) in one embodiment, the combined set of key entities is combined into said each spatial partition when said each spatial partition is created; and/or (2) in another embodiment, the combined set of key entities in combined into said each spatial partition when said each spatial partition is loaded in the memory of the device. As discussed above, when the combination occur can depend or be configured based on available storage versus CPU usage at running. For example, combining the key entities into each partition when the partitions are created will increase the size of each partition by the size of the decoding graph of the key entities, but would not require any processing time for the combination at runtime. In contrast, combining the key entities only when each partition is loaded into memory avoids increasing the size of each as stored partition but incurs CPU costs at runtime to perform the dynamic combination.

At process 407, the indexing module 303 creates a retrieval index to map the one or more key entities in the combined set of key entities to a corresponding partition from among the one or more spatial partitions. In one embodiment, a first partition from among the one or more spatial partitions, the combined set of key entities, and the retrieved index are stored in a memory of the device for processing a voice input signal. Then a second partition is retrieved based on the combined set of key entities and the retrieval index to automatically re-process the voice input signal when an out-of-vocabulary result is obtained with respect to the first partition.

Figure 5:
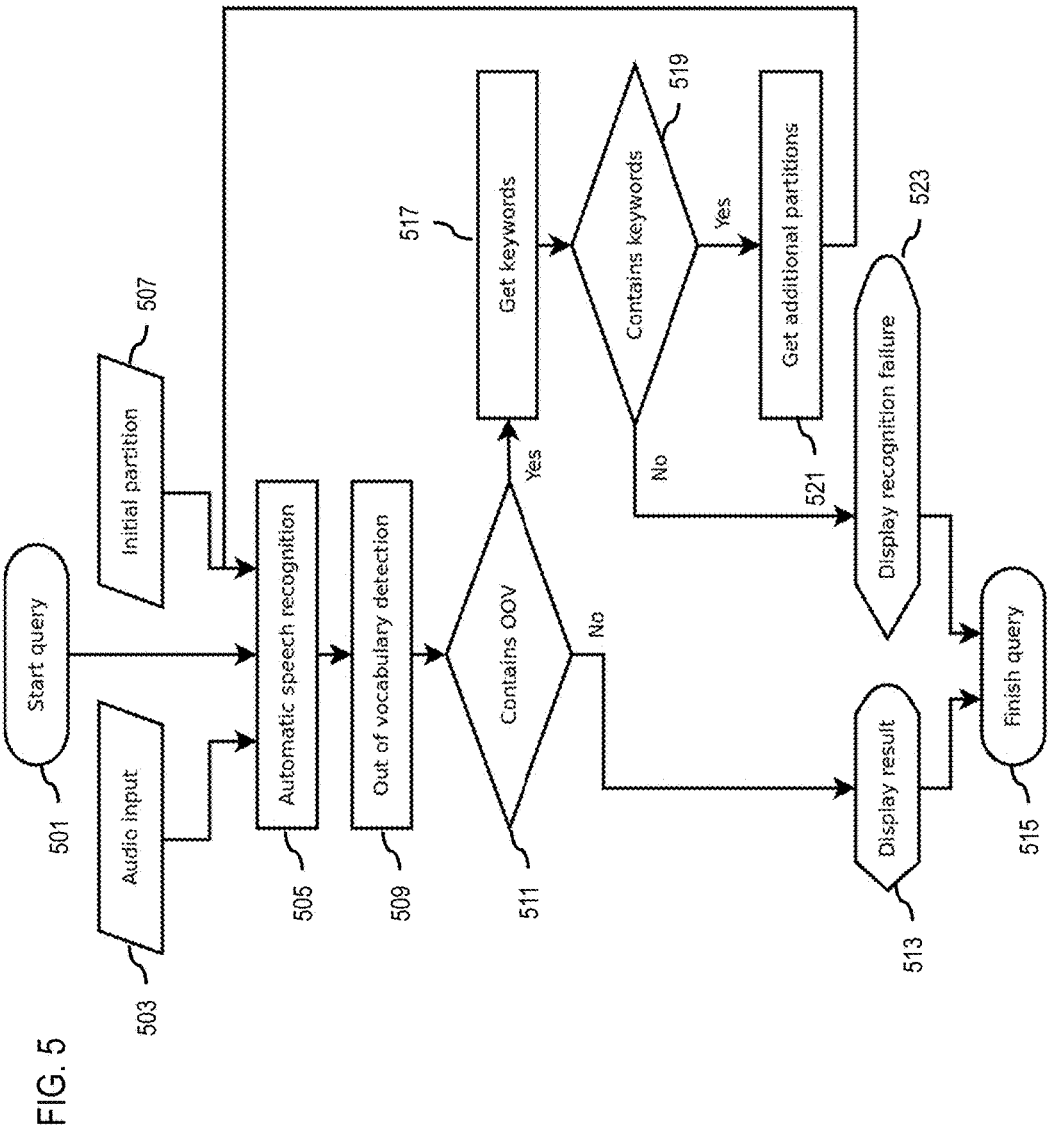
FIG. 5 is a flowchart of a process for out-of-vocabulary selection of spatial partitions for global voice-based entry of geographic information, according to one embodiment.

FIG. 5 is a flowchart of a process for out-of-vocabulary selection of spatial partitions for global voice-based entry of geographic information, according to one embodiment. The process 500 of FIG. 5 is performed after a global speech decoding graph has been spatially partitioned as described, for instance, in the process 400 of FIG. 4. In various embodiments, the client 103, platform 117, and/or the modules 301-307 as shown in FIG. 3 may perform one or more portions of the process 500 and may be implemented in, for instance, a chip set including a processor and a memory as shown in FIG. 11. As such, the client 103, platform 117, and/or the modules 301-307 can provide means for accomplishing various parts of the process 500, as well as means for accomplishing embodiments of other processes described herein in conjunction with other components of the system 100. Although the process 500 is illustrated and described as a sequence of steps, it is contemplated that various embodiments of the process 500 may be performed in any order or combination and need not include all of the illustrated steps.

At process 501, a user initiates a voice-based entry of geographic information (e.g., a query specifying geographic or location information) by providing an audio input 503 (e.g., a voice signal input capture via a microphone of the device 101) that is received by the speech recognition client 103 (and/or the speech recognition platform 117).

At process 505, the speech recognition client 103 initiates a speech recognition process on the audio input 503 using an initial partition decoding graph $D_{initial}$ (initial partition 507). In one embodiment, the speech recognition process results in generating a decoding lattice, or an equivalent data structure that represents possible interpretations of the utterances in the audio input 503. By way of example, the lattice includes an array of detected utterances (e.g., phonemes) along with a recognized or possible interpretation of what entity corresponds to the utterances as determined using the lexicon and grammars of the active decoding graph.

At process 509, the OOV detection module 305 attempts to classify whether the decoding lattice is an OOV result for the audio input 503. In others word, with the combination of processes 505 and 509, the OOV detection module 305 processes the voice-based input or the decoding lattice generated from a recognition attempt of the audio input 503 to detect an out-of-vocabulary result with respect to the first or initial partition 507. In one embodiment, the OOV result can be based on analysis of the audio input 503 to extract utterances as individual syllables. The individual syllables can then be used as sub-word units in continuous speech recognition. The recognition status of the sub-word units (e.g., based on an n-gram array of the syllables) can be used to detect an OOV result. It is also contemplated that any method known in the art for detecting an OOV result for a given decoding graph can be used in the various embodiments described herein.

At process 511, the OOV detection module 305 determines whether there is a OOV situation by evaluating whether any of the possible interpretations identified in the decoding lattice include any key location entities that were determined from other spatial partitions when the global speech decoding graph was partitioned (e.g., according to the process 400 of FIG. 4 and as previously described).

If there is no OOV result, then the speech recognition client 103 displays the results of the speech recognition (e.g., the most likely interpretations of the utterances as specified in the decoding lattice) (at process 513) to finish the interaction or complete the query (at process 515).

However, at process 517, in response to a detected OOV result or situation, the OOV detection module 305 recognizes at least one keyword uttered in the voice-based input (e.g., the audio input 503). At process 519, the OOV detection module 305 determines whether the recognized keyword (e.g., recognized because the keyword appears in the decoding lattice resulting from initial partition 507) is included or otherwise contained in the combined set of key entities extracted from the multiple spatial partitions. The at least one keyword, for instance, corresponds to at least one of the key entities that were combined into each spatial partition.

At process 521, if the keyword is recognized as a key entity, then the partition loading module 307 determines a second or additional partitions to retrieve based on the keyword and the retrieval index generated during decoding graph partitioning. In one embodiment, the retrieval index maps key entities to particular spatial partitions of the global decoding graph that may be able to successfully interpret the audio input 503. Accordingly, the partition loading module 307 compares the recognized keyword to the key entities in the retrieval index to determine the corresponding partition(s). In one embodiment, the index may specify multiple partitions corresponding to a single key entity or keyword. In this case, the multiple partitions can be loaded simultaneously if memory capacity allows, or sequentially if memory capacity is limited.

In one embodiment, multiple keywords corresponding to multiple key entities may appear in the decoding lattice even when there is a detected OOV result. In this case, the partition loading module 307 can determine which keyword or corresponding partition to prioritize or load based on an importance factor of the at least one keyword, a usage pattern of the at least one keyword, a proximity of an area covered by the at least one keyword, or a combination thereof. In one embodiment, usage patterns of keywords may be derived from user mobility pattern analysis (e.g., determining keywords occurring at locations or places visited by a user at certain times). Therefore, in this embodiment, usage patterns of keywords determine not only which are the most frequently used keywords (and hence required partitions), but also predict future user movements at given times.

For example, an OOV decoding lattice may include both "Paris" and "Villepinte" (a suburb of Paris). When analyzing using an importance factor, Paris may be designated as more important than Villepinte because Paris is the capital city of France. Accordingly, the partition corresponding to Paris will be retrieved first. When analyzing based on usage pattern, an individual user who lives in Villepinte but works in Paris during the weekdays may show usage or mobility patterns that indicate Paris as a more frequent search or destination than Villepinte during weekdays, and the opposite on the weekends. Accordingly, the partition loading module 307 may prioritize the partition including Paris on weekdays, and then prioritize the partition including Villepinte during the weekend. Different combinations of destinations and times that are determined from use mobility patterns can result in different predicted locations for the user, and therefore, different partition loading priorities. Similarly, when analyzing based on a proximity of an area, if the user is detected to be located closer to Paris than to Villepinte, then Paris partition can be retrieved first. These three criteria are provided by way of illustration and not limitation, and it is contemplated that the system 100 can use any criteria for prioritizing between detected keywords and corresponding decoding graph partitions.

After the new partition or partitions are loaded in place of the initial partition 507, the speech recognition client 103 automatically re-interprets the audio input 503 without additional user interaction. For example, the speech recognition client 103 returns to step 505 to obtain new decoding lexicons and grammars from the newly loaded partition to seamlessly re-interpret the user's initial voice signal input and generate a new decoding lattice for possible interpretations under the new spatial partitions.

In one embodiment, instead of re-processing the audio input 503 locally at the device, the speech recognition client 103 can transmit the audio input 503 (e.g., voice signal input) to a network platform (e.g., the speech recognition platform 117) to re-process the audio input 503. The speech recognition platform 117, for instance, is the platform from which the speech recognition client 103 can retrieve the new spatial partitions, and therefore would already have access to the required partitions. The speech processing platform 117 can then transmit the recognition results back to the speech recognition client 103.

In one embodiment, the speech recognition client 103 can transmit the audio input 503 and/or any subsequent voice signal inputs for processing by the speech recognition platform 117 or other network platform until the new spatial partitions can be successfully retrieved and stored in local memory. For example, the speech recognition client 103 can transmit both the audio input 503 and a request for the new partition to the speech recognition platform 117. As the new partition is being downloaded locally to the device, the initial audio input 503 is processed on the network side concurrently. Then any subsequent audio inputs received at the device can be processed locally once the new partition is stored and active in the local memory of the device. This can be advantageous in that the latency of sending the audio input 503 to the network platform or server and processing the audio input 503 there can be faster than downloading the new partition and then re-processing it locally, because the audio input 503 is usually much smaller than the partition size.

In one embodiment, the determining of additional partitions and the re-processing of the voice input signal is performed recursively until a subsequently retrieved partition does not generate the out-of-vocabulary result, until there are no remaining partitions from among the one or more spatial partitions, or until a recognition failure condition is met (e.g., a time threshold is exceeded, a number of retrieved partitions is exceeded, etc.).

If a failure condition is met (e.g., the decoding lattice contains no key entities from which a corresponding partition can be determined), then the speech recognition client 103 can display a recognition failure (at process 523).

Figure 6:
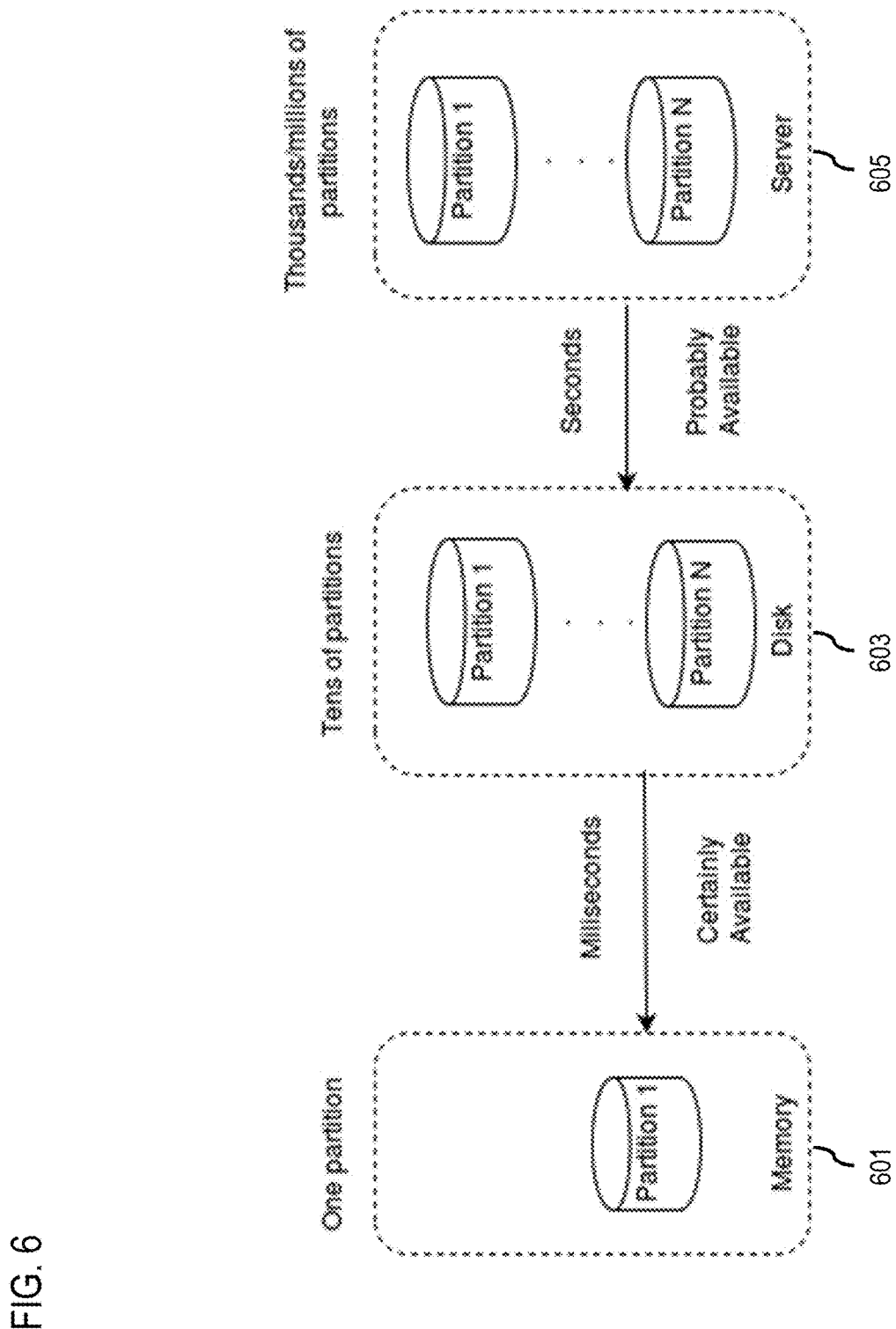
FIG. 6 is a diagram of a partition location hierarchy, according to one embodiment.

FIG. 6 is a diagram of a partition location hierarchy, according to one embodiment. As previously discussed, in one embodiment of the system 100, decoding graph partitions can be stored in a memory 601 of the device (e.g., the active speech decoding graphs in memory 107 of the device 101), in a local storage 603 of the device 101 (e.g., the local speech decoding graphs 111 stored in a disk unit, a flash memory unit, etc.), or in a remote server storage 605 (e.g., the remote decoding graphs 113 of the speech recognition platform 117). These storage locations create a hierarchy of storage capacities and graph availability, as shown in FIG. 6. In one embodiment, a common set up is to have a single decoding graph (partition) in the memory 601 during decoding, tens of partitions in local disk or storage unit 603, and thousands/millions of partitions in the remote server 605. However, under this common scenario, in a situation where the active partition in the memory 601 of the device 101 does not contain a certain symbol or location entity (for example, a street name), additional partitions have to be loaded either from the disk unit 603 (e.g., if available in the disk unit 603) or from the remote server 605 (e.g., if not available in the disk unit 603).

In one embodiment, loading a partition has a cost which is a function of how long it takes to load that partition and how likely it is that the channel will be available. For example, loading a partition from the disk 603 usually takes a few milliseconds and the channel is practically certainly available (e.g., because the event of a disk failure is comparatively rare compared to that of a broken network connection). However, practical automatic speech recognition (ASR) systems are typically constrained by a certain disk usage budget which means that in practice, only a few (tens of) partitions can be stored on the disk 603 at any given time. On the other hand, a remote server 605 can store a significantly higher number of partitions (thousands or even millions), but it usually takes much more time to load a partition from a remote server 605 than it would to load it from a disk 603. In one embodiment, there is an additional cost of finding/retrieving a partition given a keyword which applies to both cases, server 605 and disk 603.

As previously discussed, the main advantage of a partitioned decoding graph is that it allows a more efficient resource usage. This happens for two main reasons. Firstly, smaller (finer grained) decoding graphs require less memory. Secondly, a common practice during decoding is to prune less promising paths in the decoding graph in order to keep the CPU cost under a certain budget (usually measured in terms of real time factor). Smaller decoding graphs allow proportionally exploring of a larger number of promising paths. Therefore, in one embodiment, partitions can be allocated among the memory 601, disk or local storage 603, and remote server storage 605 according to a utility (cost) function as described with respect to FIG. 7 below.

Figure 7:
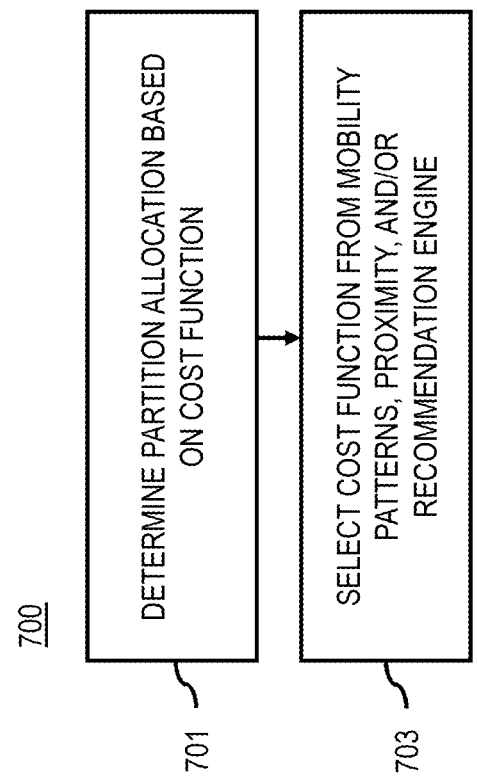
FIG. 7 is a flowchart of a process for partition management across system locations, according to one embodiment.

FIG. 7 is a flowchart of a process for partition management across system locations, according to one embodiment. In various embodiments, the client 103, platform 117, and/or the modules 301-307 as shown in FIG. 3 may perform one or more portions of the process 400 and may be implemented in, for instance, a chip set including a processor and a memory as shown in FIG. 11. As such, the client 103, platform 117, and/or the modules 301-307 can provide means for accomplishing various parts of the process 700, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all of the illustrated steps.

In one embodiment, the partition management can be formulated as a knapsack problem where the set of partitions to store in the local storage unit (e.g., disk, flash memory) of the device 101 can be chosen in a way that maximizes the utility given a partition budget (e.g., capacity of the disk or local unit 603). In one embodiment, the focus of the knapsack is on the location storage unit or disk 603 because the disk offers a balance between capacity (e.g., greater than the memory 601), while also providing better availability (e.g., disk failure less likely network connection failure associated accessing the remote server 605) and load times (e.g., faster than remote server loading). However, the partition management and allocation process can be used on any of the graph storage locations described herein.

Accordingly, at process 701, the partition loading module 307 determines which decoding graph partitions to allocate among the memory of the device, a local storage unit of the device, a remote storage unit accessible by the device or a data network, or a combination thereof based on a cost function. In one embodiment, the partition loading module 307 selects the cost function from among functions based on a mobility pattern, a proximity value, a recommendation engine, or a combination thereof (at process 700).

For example, a cost function based on mobility patterns keep the partitions which are more likely to be recalled given the mobility pattern of the user in a more readily accessible location (e.g., the memory 601 and/or the disk 603). A cost function based on proximity keeps the partitions which contain location entities (e.g., street or POI names) that are closer in distance to a user in a more readily accessible location. Finally, a cost function based on a recommendation engine can train a predictive or other recommendation model to learn the likelihood of a user retrieving or recalling certain partitions. The partition loading module 307 can then use the predicted likelihood to select the most likely subset of partitions to store in a more readily accessible location. In one embodiment, the recommendation model can be based on usage patterns of keywords by the user. As discussed above with respect to partition management, the usage patterns of keywords can be further based on keywords derived from places or locations represented in user mobility patterns under different contextual circumstances (e.g., time, date, activity, etc.).

Figure 8:
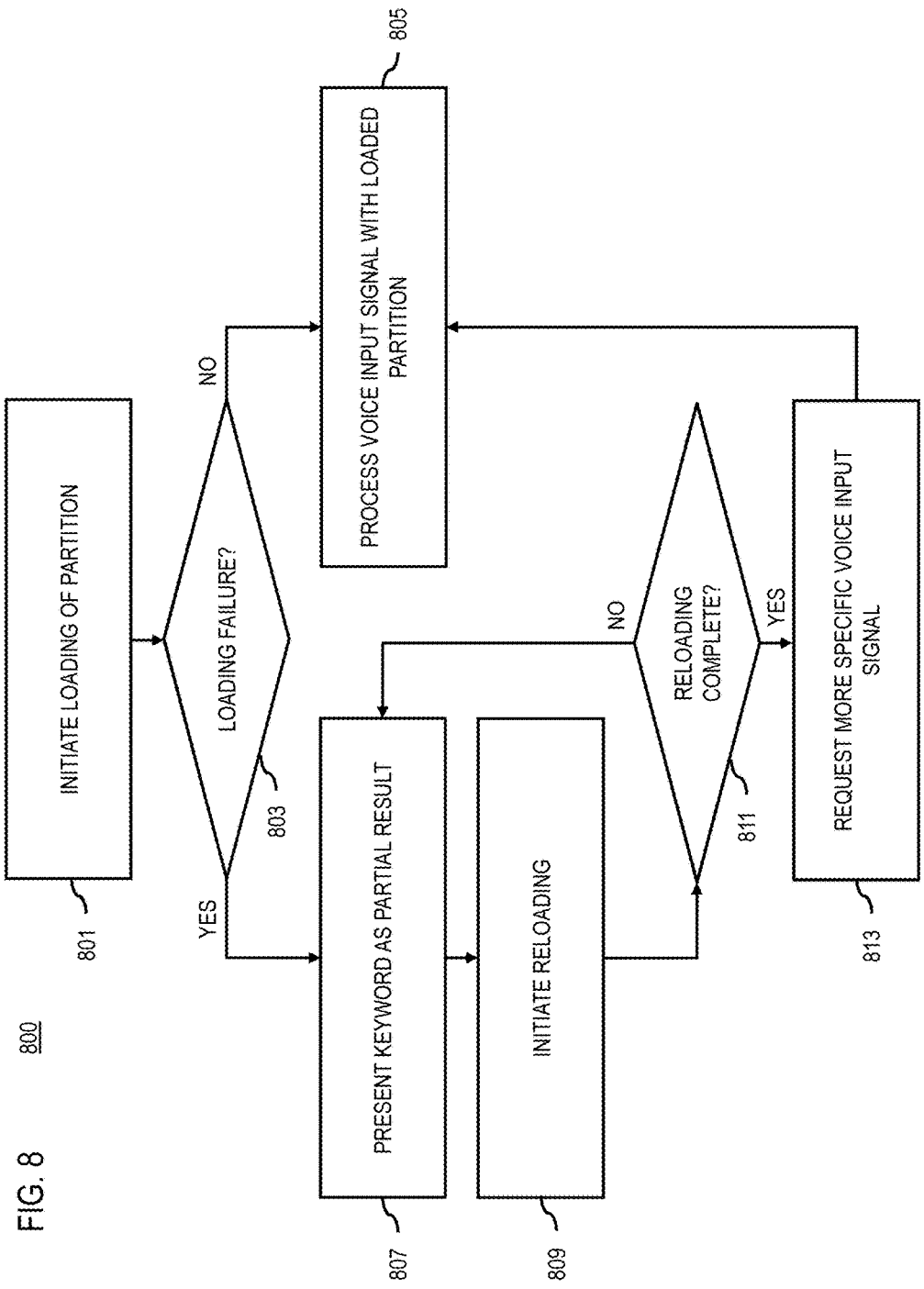
FIG. 8 is a flowchart of a process for handling partition loading failure during global-voice-based entry of geographic information, according to one embodiment.

FIG. 8 is a flowchart of a process for handling partition loading failure during global-voice-based entry of geographic information, according to one embodiment. In various embodiments, the client 103, platform 117, and/or the modules 301-307 as shown in FIG. 3 may perform one or more portions of the process 800 and may be implemented in, for instance, a chip set including a processor and a memory as shown in FIG. 11. As such, the client 103, platform 117, and/or the modules 301-307 can provide means for accomplishing various parts of the process 800, as well as means for accomplishing embodiments of other processes described herein in conjunction with other components of the system 100. Although the process 400 is illustrated and described as a sequence of steps, its contemplated that various embodiments of the process 800 may be performed in any order or combination and need not include all of the illustrated steps.

In one embodiment, because the system 100 relies on dynamically loading speech decoding partitions based on, for instance, a detected OOV result, the system 100 can be susceptible to partition loading failures, particularly when the partitions are being loaded from a remote or server-based location. Accordingly, the process 800 provides for a graceful handling of failures when load required partitions.

One embodiment of this handling procedure begins at process 801 when the partition loading module 307 initiates a loading or retrieval of a partition (e.g., into an active memory of a device 101). At process 803, the partition loading module 307 determines whether there is a loading failure of the requested partition (e.g., when the partition is not available locally but the device currently lacks network connectivity). If there is no loading failure, the speech recognition clients proceeds to process voice input signals with the loaded partition as normal (at process 805).

However, at process 807, if a failure is detected, the partition loading module 307 can return any key entities recognized in an initial speech recognition attempt using a previous partition as a partial result until such time that the requested new partition can be successfully loaded. For example, since the key entities typically represent rough geographical locations (cities or neighborhoods), a partial destination entry could be performed, delaying the exact destination specification for a later time when the required partition can be retrieved from a remote server. During this delay, at process 809, the partition loading module 307 can initiate a reloading of the failed partition and repeat the process until it determines that reloading is successfully completed (at process 811) or some other failure condition is reached (e.g., maximum number of reloading attempts, a time threshold is exceeded, etc.).

If the requested partition is successfully reloaded, the initial voice input can be processed to determine a complete result. Alternatively, the speech recognition client 103 can present a request for a user to provide another voice input signal to augment the partial result when the second partition is loaded successfully into the memory of the device (at process 813). This additional input can then be processed by the speech recognition client 103. An example of this user interaction is provided below with respect to FIG. 9.

Figure 9:
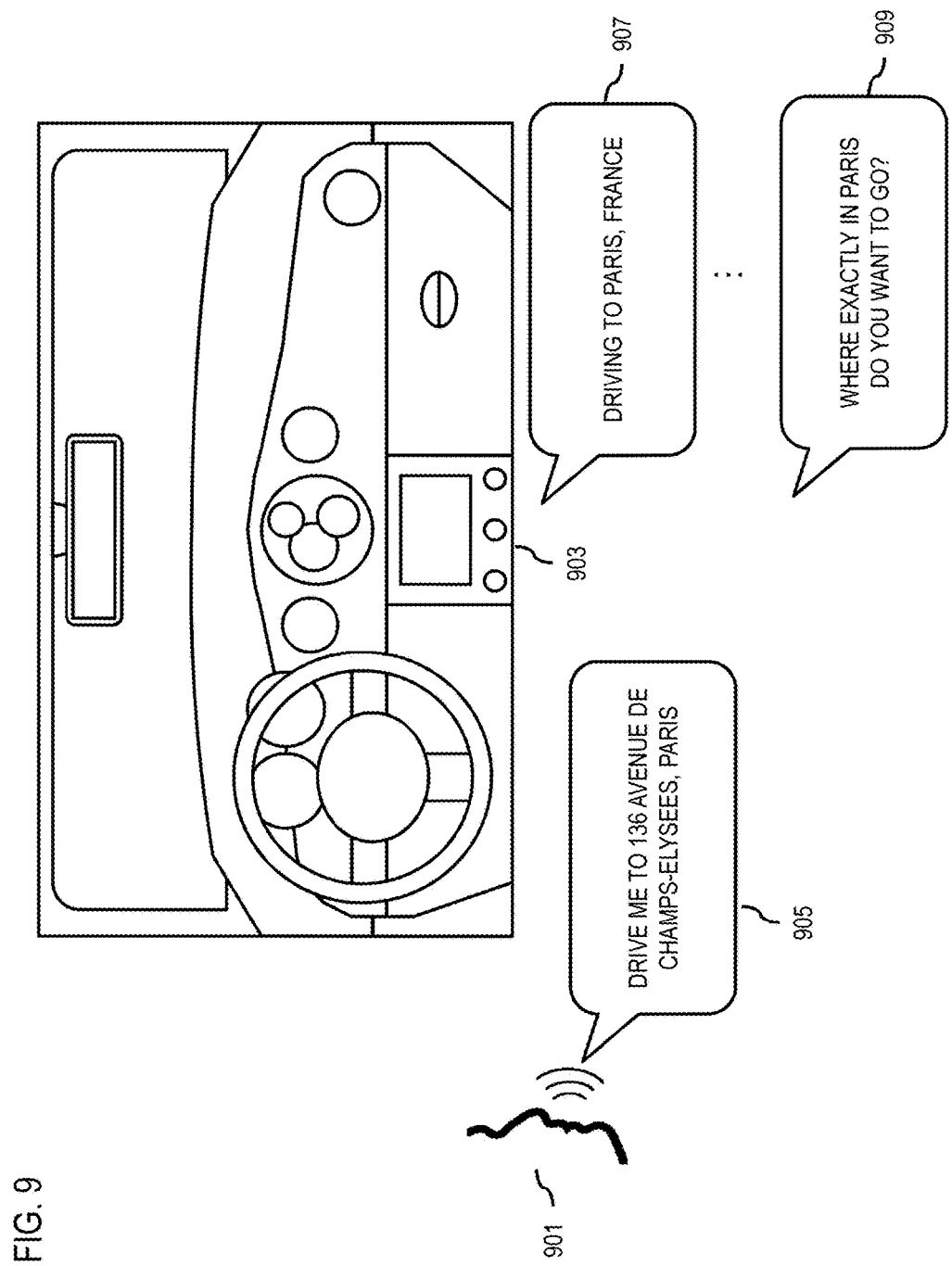
FIG. 9 is a diagram illustrating a user interaction with a navigation system configured for global-voice based entry of geographic information, according to one embodiment.

FIG. 9 is a diagram illustrating a user interaction with a navigation system configured for global-voice based entry of geographic information, according to one embodiment. In the example of FIG. 9, a user 901 is interacting with a navigation system 903 configured with voice destination entry (VDE). The user is currently located in Germany, and only the speech decoding graph partitions for Germany are available locally in the navigation system 903. The user 901 initiates a command 905 by stating to the VDE system 903, "Drive me to 136 Avenue des Champs-Élysées, Paris." This voice signal input is captured and processed by the system 903.

However, because the system 903 includes only the speech decoding graph partitions for Germany, the system 903 is only able to interpret an utterance in the voice signal input that corresponds to "Paris" (e.g., a key location entity that was combined into each partition during partitioning of the global speech decoding graph). Per the various embodiments described herein, the system 903 attempts to load the required partition for the Paris metropolitan area from a remote network location (e.g., the remote decoding graphs 113). During this attempt, the system 903 encounters a network failure, and the required partition is not loaded.

In this case, the system 903 detects this failure and initiates routing to Paris in general, while attempting to reload the required partition. The system 100 also responds with a message 907 to the user indicating "Driving to Paris, France." In this way, the system 903 provides an improved user experience by initiating the routing request with the best available information while the system 903 attempts to overcome the network issue with minimal user intervention.

In other words, the system 903 silently retries loading of the required partition. Once the partition is successfully loaded, the system 903 presents another message 909 to prompt the user "Where exactly in Paris do you want to go?" The additional voice input from the user can then be interpreted using the newly loaded partition for the Paris metropolitan area. Alternatively, instead of asking for an additional input, the system 903 can save the initial utterance and then re-process the initial utterance according to the various embodiments described herein to determine the final destination. In one embodiment, the system 903 can proceed automatically to the destination determined from the re-processing. In another embodiment, the system 903 can presented the determined final destination for confirmation or editing by the user.

The processes described herein for providing global voice-based entry of geographic information in a device may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below. In one embodiment, the processes described herein advantageously enables the system 100 to provide a more seamless user experience for voice interaction than previously possible in such constrained environments (e.g., embedded and/or mobile devices), thereby eliminating the necessity of a rigid structured search interface and allowing a more natural interaction.

Figure 10:
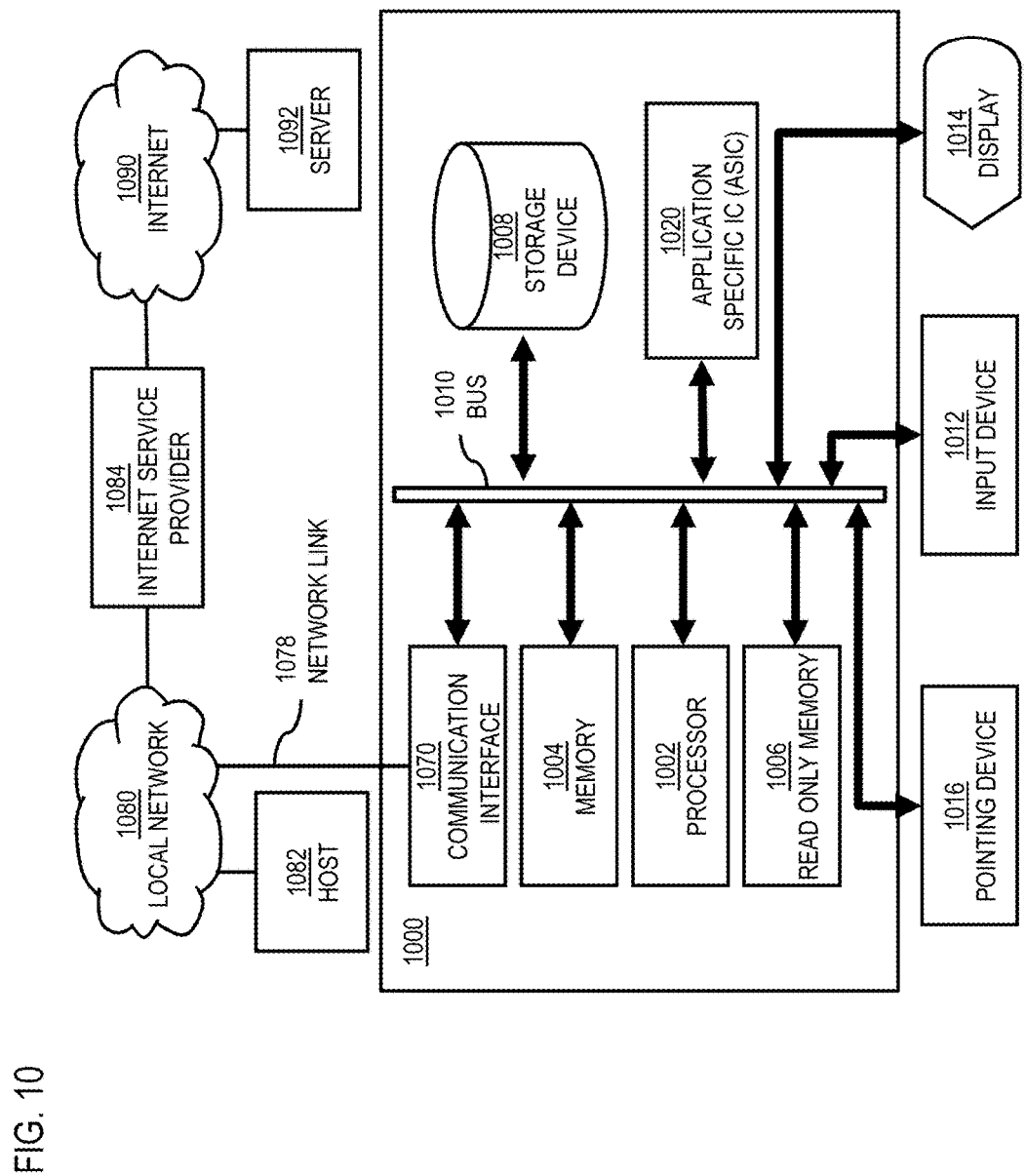
FIG. 10 is a diagram of hardware that can be used to implement an embodiment of the invention.

FIG. 10 illustrates a computer system 1000 upon which an embodiment of the invention may be implemented. Computer system 1000 is programmed (e.g., via computer program code or instructions) to provide global voice-based entry of geographic information in a device as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to providing global voice-based entry of geographic information in a device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for providing global voice-based entry of geographic information in a device. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing global voice-based entry of geographic information in a device, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a liquid crystal display (LCD), organic light-emitting diode (OLED), or other screen technology or output device (e.g., printer) for presenting text or images. In one embodiment, the display device 1014 supports direct user interaction or manipulation via, for instance, a touch screen, gesture-based detection, and/or the like. In addition or alternatively, a pointing device 1016, such as a mouse or a trackball or cursor direction keys, or motion sensor, can be used for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 115 for providing global voice-based entry of geographic information in a device.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 11 illustrates a chip set 1100 upon which an embodiment of the invention may be implemented. Chip set 1100 is programmed to provide global voice-based entry of geographic information in a device as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide global voice-based entry of geographic information in a device. The memory 1105 also stores the data associated with or generated by the execution of the inventive steps.

Figure 12:
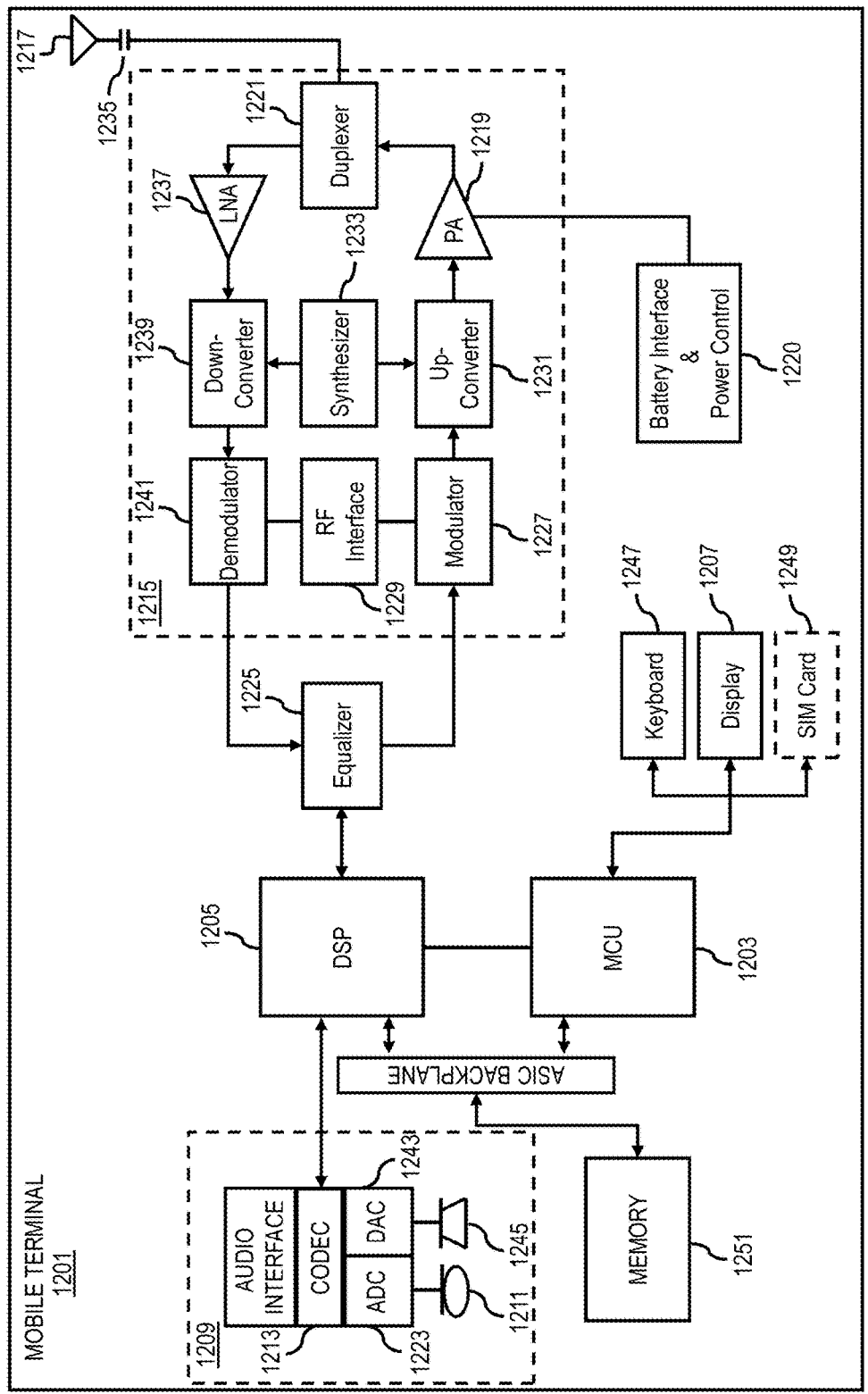
FIG. 12 is a diagram of a device (e.g., embedded or mobile computer) that can be used to implement an embodiment of the invention.

FIG. 12 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to provide global voice-based entry of geographic information in a device. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for automatic speech recognition in a device, comprising:

partitioning a global speech decoding graph into one or more spatial partitions according to a geographic topology of one or more geographic entities, one or more geographic terms, or a combination thereof, wherein each of the spatial partitions contains a decoding graph comprising a sub-set of the one or more geographic entities, the one or more geographic terms, or a combination thereof associated with a geographic area;

determining one or more of key entities occurring in each of the one or more spatial partitions, wherein at least one of the one or more of key entities includes at least one of the one or more geographic entities and the one or more geographic terms;

constructing a combined set of key entities comprising the one or more key entities from said each spatial partition;

creating a retrieval index to map the one or more key entities in the combined set of key entities to a corresponding partition from among the one or more spatial partitions, wherein a voice input signal associated with a request for one or more navigation or mapping related services is processed, using automatic speech recognition and a first partition associated with a first geographic area from among the one or more spatial partitions, the combined set of key entities, and the retrieved index are stored in a memory of the device, and wherein a second partition that is associated with a second geographic area and not in the memory of the device is retrieved based on the combined set of key entities and the retrieval index to automatically re-process the voice input signal when an out-of-vocabulary result is obtained with respect to the first partition and to provide the one or more navigation or mapping related services via a user interface based, at least in part, on the re-processing.

2. The method of claim 1, further comprising:

processing the voice-based input to detect the out-of-vocabulary result with respect to the first partition;

in response to the out-of-vocabulary result, recognizing at least one keyword in the voice-based input that is in the combined set of key entities;

determining the second partition based on the at least one keyword and the retrieval index; and initiating a re-processing of the voice input signal using the second partition.

3. The method of claim 2, wherein the re-processing of the voice input signal is performed recursively until a subsequently retrieved partition does not generate the out-of-vocabulary result or until there are no remaining partitions from among the one or more spatial partitions.

4. The method of claim 2, wherein the determining of the second partition is further based on an importance factor of the at least one keyword, a usage pattern of the at least one keyword, a proximity of an area covered by the at least one keyword, or a combination thereof.

5. The method of claim 2, wherein the second partition is loaded into the memory of the device to initiate the re-processing of the voice-based input, the method further comprising:

determining a failure of the second partition to load into the memory of the device; and returning the at least one keyword as a partial result until the second partition is loaded successfully into the memory of the device.

6. The method of claim 5, further comprising:

presenting a request for a user to provide another voice input signal to augment the partial result when the second partition is loaded successfully into the memory of the device.

7. The method of claim 2, wherein the first partition, the second partition, or combination thereof is stored in the memory of the device, a local storage unit of the device, a remote storage unit accessible by the device or a data network, or a combination thereof based on a cost function.

8. The method of claim 7, wherein the cost function is based on a mobility pattern, a proximity value, a recommendation engine, or a combination thereof.

9. The method of claim 1, further comprising:

transmitting the voice input signal to a network platform from which the second partition can be retrieved, wherein the voice input signal is re-processed by the network platform using the second partition.

10. The method of claim 9, wherein the voice input signal, a subsequent voice input signal, or a combination thereof is transmitted to the network platform for re-processing until the second partition is downloaded to the memory of the device.

11. The method of claim 1, further comprising:

determining the one or more key entities based on an occurrence frequency in location queries for said each spatial partition, based on whether the one or more key entities can be further sub-divided, or a combination thereof.

12. The method of claim 1, further comprising:

determining the one or more key entities based on a number of contained entities, a popularity of a destination indicated in the one or more key entities, a user mobility history, or a combination thereof.

13. The method of claim 1, wherein the combined set of key entities includes a lexicon and a grammar associated with the one or more key entities.

14. The method of claim 1, wherein the combined set of key entities is combined into said each spatial partition when said each spatial partition is created.

15. The method of claim 1, wherein the combined set of key entities is combined into said each spatial partition when said each spatial partition is loaded in the memory of the device.

16. An apparatus for automatic speech recognition in a device, comprising:

at least one processor; and at least one memory including computer program code for one or more programs, the at least one memory and the computer program code configured to, with the at least one processor, cause the apparatus to perform at least the following, partition a global speech decoding graph into one or more spatial partitions according to a geographic topology of one or more geographic entities, one or more geographic terms, or a combination thereof, wherein each of the spatial partitions contains a decoding graph comprising a sub-set of the one or more geographic entities, the one or more geographic terms, or a combination thereof associated with a geographic area;

determine one or more of key entities occurring in each of the one or more spatial partitions, wherein at least one of the one or more of key entities includes at least one of the one or more geographic entities and the one or more geographic terms;

construct a combined set of key entities comprising the one or more key entities from said each spatial partition;

create a retrieval index to map the one or more key entities in the combined set of key entities to a corresponding partition from among the one or more spatial partitions, wherein a voice input signal associated with a request for one or more navigation or mapping related services is processed, using automatic speech recognition and a first partition associated with a first geographic area from among the one or more spatial partitions, the combined set of key entities, and the retrieved index are stored in a memory of the device, and wherein a second partition that is associated with a second geographic area and not in the memory of the device is retrieved based on the combined set of key entities and the retrieval index to automatically re-process the voice input signal when an out-of-vocabulary result is obtained with respect to the first partition and to provide the one or more navigation or mapping related services via a user interface based, at least in part, on the re-processing.

17. The apparatus of claim 16, wherein the apparatus is further caused to:
process the voice-based input to detect the out-of-vocabulary result with respect to the first partition in the memory of the device;
in response to the out-of-vocabulary result, recognize at least one keyword in the voice-based input that is in the combined set of key entities in the memory of the device;
determine the second partition that is not in the memory of the device based on the at least one keyword and the retrieval index; and
initiate a re-processing of the voice input signal using the second partition.

18. The apparatus of claim 17, wherein the re-processing of the voice input signal is performed recursively until a subsequently retrieved partition does not generate the out-of-vocabulary result or until there are no remaining partitions from among the one or more spatial partitions.

19. The apparatus of claim 17, wherein the determining of the second partition based on the at least one keyword and the retrieval index is further based on an importance factor of the at least one keyword, a usage pattern of the at least one keyword, a proximity of an area covered by the at least one keyword, or a combination thereof.

20. A non-transitory computer-readable storage medium for automatic speech recognition in a device, carrying one or more sequences of one or more instructions which, when executed by one or more processors, cause an apparatus to at least perform the following steps:
partitioning a global speech decoding graph into one or more spatial partitions according to a geographic topology of one or more geographic entities, one or more geographic terms, or a combination thereof, wherein each of the spatial partitions contains a decoding graph comprising a sub-set of the one or more geographic entities, the one or more geographic terms, or a combination thereof associated with a geographic area;
determining one or more key entities occurring in each of the one or more spatial partitions, wherein at least one of the one or more of key entities includes at least one of the one or more geographic entities and the one or more geographic terms;
constructing a combined set of key entities comprising the one or more key entities from said each spatial partition;
creating a retrieval index to map the one or more key entities in the combined set of key entities to a corresponding partition from among the one or more spatial partitions,
wherein a voice input signal associated with a request for one or more navigation or mapping related services is processed, using automatic speech recognition and a first partition associated with a first geographic area from among the one or more spatial partitions, the combined set of key entities, and the retrieved index are stored in a memory of the device, and
wherein a second partition that is associated with a second geographic area and not in the memory of the device is retrieved based on the combined set of key entities and the retrieval index to automatically re-process the voice input signal when an out-of-vocabulary result is obtained with respect to the first partition and to provide the one or more navigation or mapping related services via a user interface based, at least in part, on the re-processing.

21. The non-transitory computer-readable storage medium of claim 20, wherein the apparatus is further caused to perform:
processing the voice-based input to detect the out-of-vocabulary result with respect to the first partition in the memory of the device;
in response to the out-of-vocabulary result, recognizing at least one keyword in the voice-based input that is in the combined set of key entities in the memory of the device;
determining the second partition that is not in the memory of the device based on the at least one keyword and the retrieval index; and
initiating a re-processing of the voice input signal using the second partition.

22. The non-transitory computer-readable storage medium of claim 21, wherein the re-processing of the voice input signal is performed recursively until a subsequently retrieved partition does not generate the out-of-vocabulary result or until there are no remaining partitions from among the one or more spatial partitions.

* * * * *